June 14, 1960
J. L. YANDELL
2,940,370
BOTTOM HOLE CAMERA
Filed Dec. 11, 1958
2 Sheets-Sheet 1
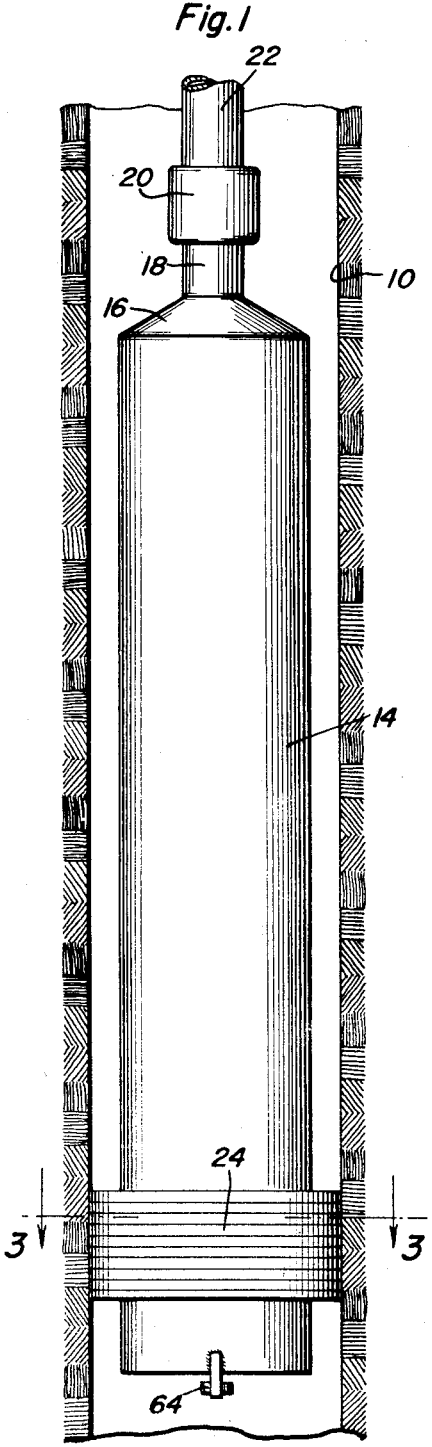
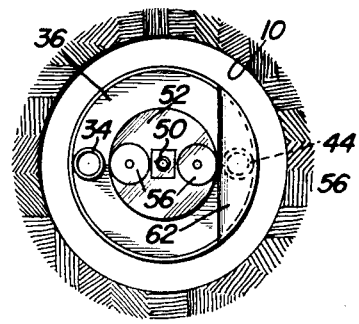
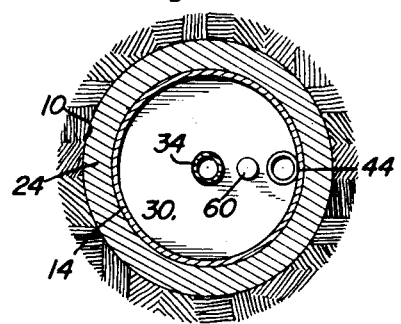
James L. Yandell
INVENTOR.

June 14, 1960   J. L. YANDELL   2,940,370
BOTTOM HOLE CAMERA
Filed Dec. 11, 1958   2 Sheets-Sheet 2
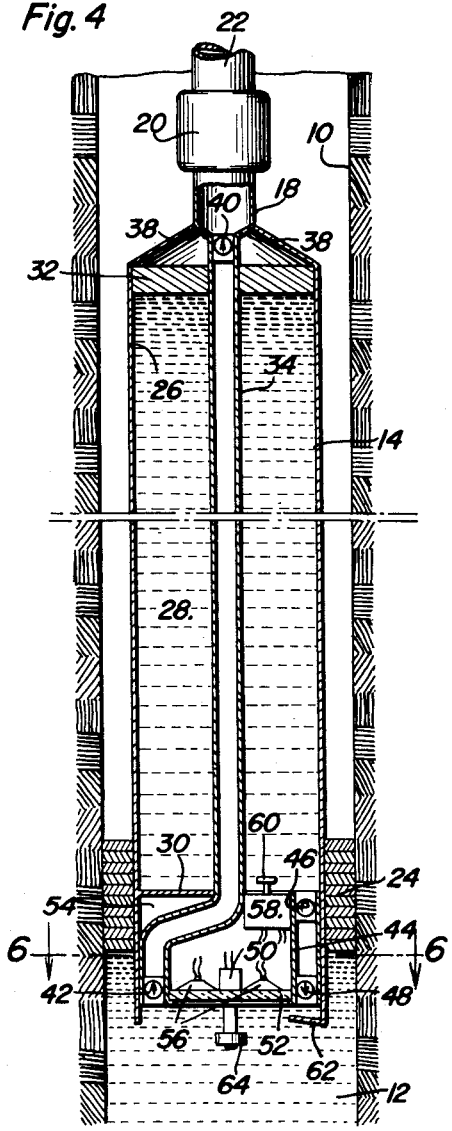
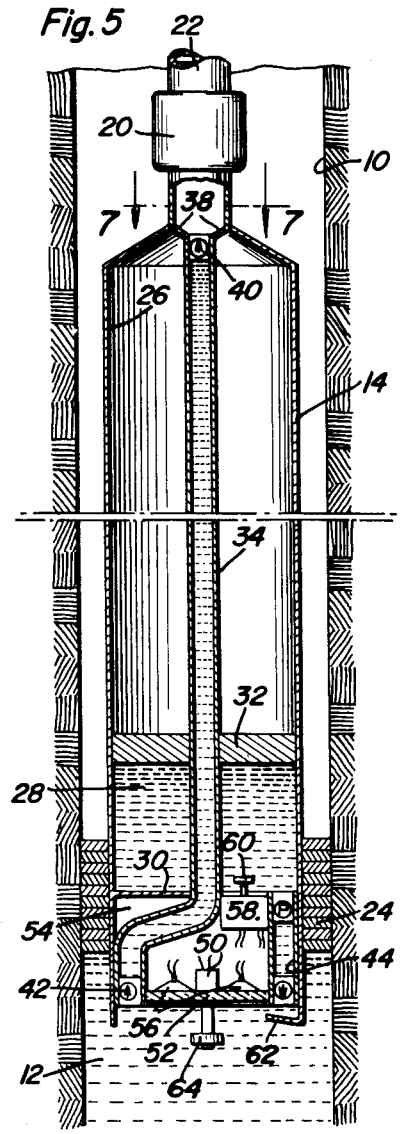
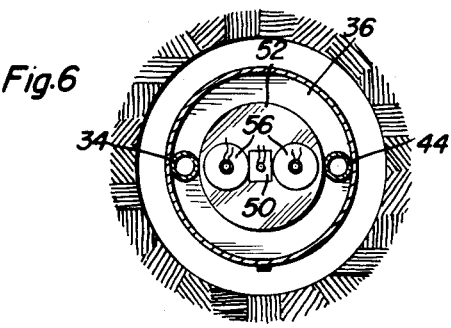
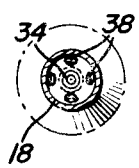
James L. Yandell
INVENTOR.

United States Patent Office 2,940,370
Patented June 14, 1960

2,940,370

BOTTOM HOLE CAMERA

James L. Yandell, Tahoka, Tex. (% Santa Fe Drilling Co., % Richmond Exp. Co., Apartado 93, Box 184, Maracaibo, Venezuela, Central America)

Filed Dec. 11, 1958, Ser. No. 779,708

11 Claims. (Cl. 95—11)

This invention comprises a novel and useful bottom hole camera and more particularly relates to an apparatus for obtaining pictures in submerged portions of a well bore and the like.

The primary object of this invention is to provide an apparatus for obtaining clear pictures at selected regions and at any depth in a well bore, which regions lie beneath the surface of a non-transparent liquid in the well bore.

A further object of the invention is to provide an apparatus in accordance with the preceding object which shall be fully automatic in its operation.

An additional object of the invention is to provide an apparatus which will replace the non-transparent fluid in a well bore at the region where it is desired to obtain a picture with a clear transparent fluid through which a clear picture can be obtained.

A still further object of the invention in accordance with the immediately preceding object is to provide an apparatus which will automatically upon the introduction of the displacement fluid into the region in which a picture is to be obtained, will effect a time delay of predetermined duration to enable settling of sediment or of the non-transparent fluid before the camera portion of the device is actuated.

Yet another object of the invention is to provide an apparatus according to the above mentioned objects wherein the discharge of the transparent fluid will be effected in such a manner as to clear the window through which the camera is to obtain the desired picture.

Another object of this invention is to provide an apparatus conforming to the above objects wherein a fluid under pressure is utilized to effect the discharge of the transparent fluid from a storage chamber in the housing of the apparatus to the region of the well bore at which a picture is to be obtained.

Still another object is to provide an apparatus which will obtain a clear picture of any selected portion of a well bore and which will also afford a visual record of a compass reading whereby to orient the view obtained.

And a final important object of the invention to be specifically enumerated herein resides in the provision of an apparatus wherein a compact unit comprising a housing may be readily positioned at selected locations in a well bore and will contain therein a camera for obtaining pictures of the region below the device, a chamber for the storage of a clear transparent displacement fluid to be discharged into the well bore below the apparatus to facilitate the obtaining of clear pictures therein, illuminating means for the region of which a picture is to be taken, means for causing discharge of the transparent fluid from the storage chamber, means for operating the camera, and whereby the operation may be initiated solely by the control of fluid pressure supplied through a string of pipe which supports the apparatus and wherein all the components of the apparatus may be housed within the housing of the same.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary view in vertical section through a portion of a well bore showing in elevation the disposition of an apparatus in accordance with this invention therein;

Figure 2 is a bottom plan view of the apparatus of Figure 1 looking upwardly from beneath the same;

Figure 3 is a horizontal sectional view taken substantially upon the plane indicated by the section line 3—3 of Figure 1;

Figure 4 is a view similar to Figure 1 but showing in vertical central section the construction and the interior of the apparatus in accordance with this invention, parts being broken away, and the apparatus being shown in readiness for operation at a selected location in the well bore;

Figure 5 is a view similar to Figure 4 but showing the position of the parts of the apparatus as the step of discharging the clear transparent fluid therefrom into the well bore is nearing its end;

Figure 6 is a horizontal sectional view taken substantially upon the plane indicated by the section line 6—6 of Figure 4; and Figure 7 is a horizontal sectional view taken substantially upon the plane indicated by the section line 7—7 of Figure 5.

The basic purpose of this invention is to provide an apparatus for obtaining clear pictures of selected regions of a well bore and in which the apparatus is disposed and immersed beneath the surface of a non-transparent liquid in the well bore. For this purpose there is provided a device which includes a camera whereby a picture can be obtained in a manner set forth hereinafter of the selected region of the well bore immediately contiguous to and beneath the apparatus.

The term "camera" in accordance with this invention comprehends within its scope both a camera for making photographs, as well as television cameras which will obtain a picture at a remote location of the camera.

Referring now more specifically to the accompanying drawings it will be observed that the numeral 10 designates generally a well bore containing a fluid 12 therein which is of a non-transparent nature and beneath the surface of which it is desired to obtain a picture of a selected region or portion of the well bore. Although not limited thereto, the present invention is specifically adapted for use in connection with oil wells or the like in which the bores 10 may extend to great depths below the surface and wherein the hydrostatic pressure of the fluid 12 therein may rise to very high values. Usually such fluids consisting most frequently of brine, oil, drilling mud or other liquids are not transparent in nature, in view of the solid matter or impurities which they obtain, are usually opaque although sometimes they may be translucent. In any event, it is very difficult for a camera when lowered to a desired region in the well bore where a picture is to be taken to obtain a picture of sufficient clarity of detail to be of any practical value. Such pictures are frequently desired in numerous situations, as for example to view the nature of the bottom of the bore, to obtain a clear understanding of obstructions to be overcome such as broken or stuck portions of equipment commonly called "fish," or for other purposes.

It is therefore the essential purpose of this invention to provide an apparatus which will satisfy these conditions and effect the obtaining of clear pictures of the desired region; which shall be completely automatic in its operation; shall be self-contained to the extent that all of its operating mechanism is enclosed in a single housing with no electrical or mechanical control means extending to the surface of the well bore.

In accordance with this invention the apparatus consists of a generally cylindrical housing 14 of any desired construction but of such a diameter that the same may be readily inserted into and positioned at a desired region in a well bore 10. At its upper end the housing is provided with a top wall 16 from which rises a net 18 which is connected as by a valve assembly 20 to the lower end of a string of pipe 22 by which the device is supported and positioned in a well bore.

The valve 20 is of a conventional type which may be opened or closed by selective rotation of the pipe string 22 relative to the housing 14. Inasmuch as valves of this type are in themselves quite well known in the art, and since the principles of this invention are not limited to any particular type of such valve, a further consideration of the construction of the valve is deemed to be unnecessary for the purpose of this invention.

Secured in any suitable manner to the exterior of the housing 14 and preferably closely adjacent to the lower end thereof is any conventional form of a packing or sealing member 24 which when the device has been set in a well bore will establish a fluid-tight seal or packing between the housing and the well bore 10 to prevent the passage of fluid therebetween. Usually the sealing or packing means 24 will be of a type which will be partially set by rotating the housing 14 in a direction which is opposite to that which opens the valve 20, and whereby the setting of the sealing means 24 is completed by lowering the weight of the pipe string 22 and of the housing 14 thereon. However, inasmuch as the particular construction and operation of such a packer or sealing means is not essential to an understanding of the principles of the invention claimed herein, a further description and discussion of the same is deemed to be unnecessary.

The interior of the housing 14, as shown in Figures 4 and 5, comprises a storage chamber or compartment 26 adapted to contain therein a clear transparent liquid as at 28 which is utilized to replace that portion of the well fluid lying immediately beneath the lower end of the device, in order to thus provide a transparent liquid medium through which a clear picture can be obtained of the desired region in the well bore.

Preferably, the chamber 28 has a bottom wall 30 comprised of a partition or the like extending thereacross and a piston 32 is slidably received in the chamber above the transparent fluid 28 therein, which upon downward travel, will serve to eject or discharge the transparent liquid from the chamber in a manner to be subsequently apparent.

A pipe or conduit 34 establishes communication between the neck 18 and the region of the well bore immediately below the bottom of the housing. In the example illustrated, this conduit extends axially through the chamber 26, having its upper end communicating with the bottom of the neck 18, while its lower end extends through the partition 30 and then through the bottom wall 36 of the housing.

At its upper end, where the pipe 34 joins the neck 18 there are provided a plurality of ports or vents 38, see in particular Figure 7, which communicate with the interior of the chamber 26 above the piston member 32.

There is also provided in the upper end of the conduit 34 an upwardly opening non-return check valve 40 which will permit the passage of fluid upwardly through the conduit 34 but will prevent downward flow therethrough. Similarly, at the lower or intake end of the conduit 34 there is provided a similar non-return upwardly opening check valve 42.

A delivery means is provided whereby fluid 28 discharged from the chamber 26 by downward travel of the piston 32, as suggested in Figure 5, may be discharged below the bottom wall 36 of the apparatus. This delivery means includes a conduit or passage 44 whose upper end communicates with the interior of the chamber 26 through the bottom wall 30 thereof by means of a downwardly opening non-return check valve 46, while a similar valve 48 is disposed in the conduit 44 at the discharge end thereof.

Disposed between the partition 30 and the bottom wall 36 previously mentioned is a camera designated generally by the numeral 50 and which as above mentioned may be of any desired type or construction, consisting either of a camera for taking photographs or a television camera for obtaining and transmitting pictures. This camera is adapted to be operated electrically from storage batteries, not shown, but housed within the housing 14 in any desired manner, these batteries operating an electric motor or other energizing means for the camera.

A transparent window 52 is seated in an opening provided in the bottom wall 36, as will be best apparent from Figure 6, or Figure 2, and the camera is mounted in the space between the partition 30 and the window 52 in a position to obtain pictures through this window.

Also disposed in this compartment, which is identified by the reference numeral 54, are a plurality of lights 56 likewise energized from the storage battery within the housing. The lights are so positioned that they will illuminate the region immediately below the window 52 when it is desired to obtain a picture of this region.

A control means indicated generally by the numeral 58 is also disposed within the compartment 54 for effecting operation of the camera 50 and of the lights 56 when desired. This control means includes an actuator 60 in the form of a piston or plunger extending through the partition 30 in a position to be engaged by the discharge piston 32 when the latter reaches the lower end of its travel.

As will be best apparent from a consideration of Figures 2, 4 and 5, there is provided a baffle 62 in the form of a deflector and which is disposed below the outlet of the passage 44 and is supported by the housing in any suitable manner. This baffle constitutes a flow directing means and is so positioned that the clear transparent liquid 28 discharged through the passage 44 upon downward travel of the discharge piston 32 will be directed across the lower face of the transparent window 52 for cleansing the same of any accumulation of opaque material thereon such as that arising during the passage of the device through the well fluid 12 as the apparatus is introduced into the well bore.

At this point it should be noted that the control means 58 includes any conventional form of time delay mechanism, and which is effective when the actuator 60 is depressed by the piston 32 to close the associated electrical circuits of the camera 50 and the lights 56 after a predetermined duration of time. Inasmuch as the construction of the time delay mechanism in the control member 58 may be of any desired type and is not in itself a part of the invention claimed herein and is not necessary to understanding of the operation of this invention, a further description or disclosure of the same is deemed to be unnecessary.

From the foregoing it is believed that the operation of the device may now be readily understood. This operation is as follows:

The storage chamber 26 is filled with the transparent fluid 28 which may be water or any other desired transparent liquid depending upon the conditions prevailing in a particular well bore. At this time the piston 32 will be at its upper extremity and the control valve 20 will be closed. With the parts in this position, the apparatus is then lowered into the well bore to a desired location, which is submerged below the surface of the liquid in the well bore. At the desired location the pipe string 22 is rotated in the proper direction for setting the packer or sealing means 24, with the weight of the pipe being then applied thereto to complete the setting of the packer. At this time the upwardly opening check valve 42 will permit the passage of the well fluid 12 upwardly in the conduit 34 to a very slight distance, compressing above it the air which originally occupied this conduit into the space below the valve 20. Thereupon, the pipe string 22 is rotated in the other direction to open the valve 20, thus permitting the hydrostatic pressure prevailing in the well bore to cause the fluid 12 to enter the lower end of the pipe string 22 and rise to a level therein which is equivalent to that of the hydrostatic pressure in the well bore beneath the packer 24. It will be observed that this packer 24 prevents the fluid in the well bore above the packer from passing downwardly into the space below the apparatus.

The mechanism and means for setting the packer 24 and for operating the valve 20 are conventional in the art and in themselves form no part of the invention claimed herein.

Now fluid pressure is applied from the surface through the pipe 22 by the usual pumps. This pressure cannot pass down the conduit 34 owing to the non-return check valves 40 and 42 therein, and therefore passes by the ports 38 into the space above the piston 32, and drives the latter downwardly as will be noted by a comparison of Figure 4 with Figure 5. This downward travel will apply pressure to the transparent liquid 28, and will discharge the same past the check valves 46 and 48 and through the conduit 44, this discharge fluid being delivered against the directive baffle 62 and caused to pass across the face of the window 52 and into the space immediately below the window. This fluid will cleanse the window of any opaque material accumulating thereon in readiness for the operation of the camera 50.

When the piston 32 completes its downward travel, so that all the fluid 28 has been displaced from the chamber 26 and thus an adequate supply of clear transparent liquid has been injected beneath the window 52 and displaced the opaque liquid from therebeneath, the plunger 32 eventually hits the actuator 60 and initiates operation of the control means 58. When the piston has reached this position so that no further travel is possible, the application of fluid pressure through the pipe 22 may be discontinued, since this condition can be readily ascertained by observing the operation of the pump by which the fluid pressure is supplied at the surface of the well bore.

Upon actuation of the actuator 60, the time delay mechanism within the member 58 is placed into operation. Accordingly after a predetermined period of time which may be in the nature of one hour or the like, the control member 58 will energize the circuits of the camera 50 and of the lights 56, placing the camera in operation and producing illumination through the window 52 and the transparent fluid below the window which has displaced the opaque well fluid, thus resulting in the obtaining of a picture or pictures of the contiguous region of the well bore lying beneath the window. The purpose of the delay is to afford sufficient time after the injection of the displacing transparent fluid into the region of which a picture is to be obtained to permit settling of the fluids therein and any sediment which may have been disturbed by the injection of the transparent fluid in order that the utmost transparency may be obtained.

After the pictures have been obtained either by a camera taking photographs or by a television camera, the housing 14 is drawn by the string of pipe 22 to the surface, the camera removed therefrom and the device reconditioned for its next operation.

In some instances it may be desired to also obtain a compass reading to assist in orienting the picture obtained. For this purpose any conventional form of compass such as that indicated at 64 is disposed beneath or above the bottom wall 36 in a position where it will be in the field of view of the camera so that the camera in obtaining the picture will also read the compass.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An apparatus for obtaining pictures in well bores comprising a housing adapted to be supported in a well bore by a string of pipe, sealing means establishing a seal between said housing and well bore, a window in the lower end of said housing, a camera in said housing behind said window for obtaining pictures therethrough, means in said housing for discharging a transparent displacement fluid into the region of the well bore immediately below said window and thereby insuring good visibility for said camera, means controlling the operation of said camera, an actuator effecting operation of said control means, means responsive to fluid pressure in said pipe for actuating said discharge means, passage means communicating said pipe with the space in said well bore below said window, an upwardly opening check valve in said passage means, a control valve in said pipe above said housing, a downwardly opening check valve in said delivery means controlling flow therethrough.

2. The combination of claim 1, including lights in said casing operable through said window for illuminating the region of the well bore adjacent thereto, said means controlling the operation of said camera simultaneously therewith energizing said lights.

3. The combination of claim 1, including a compass, means supporting said compass in a position in the field of view of said camera.

4. The combination of claim 1, wherein said fluid discharging means includes a fluid directing means for directing flow of the discharged fluid across said window for clearing the latter.

5. An apparatus for obtaining pictures in well bores comprising a housing positionable in a well bore, sealing means establishing a seal between said housing and well bore, a window in the lower end of said housing, a camera in said housing behind said window for obtaining pictures therethrough, said housing having a chamber therein receiving a supply of a transparent displacement fluid, means for delivering fluid from said chamber to the exterior of said housing beneath said window thereby insuring good visibility for said camera, said housing being supported in said well bore by a string of pipe, means responsive to fluid pressure in said pipe for causing discharge of said displacement fluid from said chamber to said delivery means, means for operating said camera, an actuator for said operating means.

6. An apparatus for obtaining pictures in well bores comprising a housing positionable in a well bore, sealing means establishing a seal between said housing and well bore, a window in the lower end of said housing, a camera in said housing behind said window for obtaining pictures therethrough, said housing having a chamber therein receiving a supply of a transparent displacement fluid, means for delivering fluid from said chamber to the exterior of said housing beneath said window thereby insuring good visibility for said camera, said housing being supported in said well bore by a string of pipe, means responsive to fluid pressure in said pipe for causing discharge of said displacement fluid from said chamber to said delivery means, means for operating said camera, an actuator for said operating means, said actuator being operable in response to operation of said fluid discharge means.

7. The combination of claim 5, including a passage means connecting said pipe with the space in the well below said window, an upwardly opening check valve in the lower end of said passage means, a control valve in said pipe above said housing a downwardly opening check valve in said delivery means controlling flow therethrough.

8. An apparatus for obtaining pictures in well bores comprising a housing positionable in a well bore, sealing means establishing a seal between said housing and well bore, a window in the lower end of said housing, a camera in said housing behind said window for obtaining picture therethrough, said housing having a chamber therein receiving a supply of a transparent displacement fluid, means for delivering fluid from said chamber to the exterior of said housing beneath said window thereby insuring good visibility for said camera, said housing being supported in said well bore by a string of pipe, means responsive to fluid pressure in said pipe for causing discharge of said displacement fluid from said chamber to said delivery means, means for operating said camera, an actuator for said operating means, said means for causing discharge including a piston slidable in said chamber for displacing fluid therefrom into said delivery means, and a communication between said pipe and said chamber above said piston whereby fluid under pressure may be applied by said pipe above said piston for actuating the latter.

9. An apparatus for obtaining pictures in well bores comprising a housing adapted to be supported in a well bore by a string of pipe communicating with the interior thereof, sealing means establishing a seal between said housing and well bore, a window in the lower end of said housing, a camera disposed behind said window for obtaining pictures therethrough, a displacement fluid receiving chamber in said housing, means for delivering fluid from said chamber to the exterior of said housing in front of said window in response to fluid pressure in said pipe, a downwardly opening check valve in said delivery means controlling flow therethrough, passage means connecting said pipe with the space in front of said window, an upwardly opening check valve in the lower end of said passage means, a control valve in said pipe above said housing.

10. The combination of claim 9, including lights in said casing operable through said window for illuminating the region of the well bore adjacent thereto, means controlling the operation of said camera simultaneously therewith energizing said lights.

11. The combination of claim 10, including a compass, means supporting said compass in a position in the field of view of said camera.

References Cited in the file of this patent

UNITED STATES PATENTS

| | | |
|---|---|---|
| 1,658,537 | Reinhold | Feb. 7, 1928 |
| 2,677,996 | Laval | May 11, 1954 |